United States Patent
Chang et al.

(10) Patent No.: US 9,922,654 B2
(45) Date of Patent: *Mar. 20, 2018

(54) INCREMENTAL UTTERANCE DECODER COMBINATION FOR EFFICIENT AND ACCURATE DECODING

(71) Applicant: Microsoft Technology Licensing, LLC, Redmond, WA (US)

(72) Inventors: Shuangyu Chang, Fremont, CA (US); Michael Levit, San Jose, CA (US); Abhik Lahiri, Mountain View, CA (US); Barlas Oguz, Fremont, CA (US); Benoit Dumoulin, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,267

(22) Filed: Dec. 13, 2016

(65) Prior Publication Data

US 2017/0092275 A1    Mar. 30, 2017

Related U.S. Application Data

(63) Continuation of application No. 14/219,642, filed on Mar. 19, 2014, now Pat. No. 9,552,817.

(51) Int. Cl.
*G10L 15/32* (2013.01)
*G10L 15/14* (2006.01)
*G10L 15/06* (2013.01)

(52) U.S. Cl.
CPC ............ *G10L 15/32* (2013.01); *G10L 15/063* (2013.01); *G10L 15/14* (2013.01)

(58) Field of Classification Search
CPC .................................................... G10L 15/32
See application file for complete search history.

(56) References Cited

U.S. PATENT DOCUMENTS

| 5,884,255 A | 3/1999 | Cox |
| 6,122,613 A * | 9/2000 | Baker ............... G10L 15/22 704/235 |

(Continued)

FOREIGN PATENT DOCUMENTS

| DE | 102006029755 | 1/2008 |
| WO | 20110149465 | 12/2011 |

OTHER PUBLICATIONS

PXT International Preliminary Report on Patentability Issued in PCT Application No. PCT/US2015/020849, dated Jun. 21, 2016, 8 Pages.

(Continued)

*Primary Examiner* — Samuel G Neway

(57) ABSTRACT

An incremental speech recognition system. The incremental speech recognition system incrementally decodes a spoken utterance using an additional utterance decoder only when the additional utterance decoder is likely to add significant benefit to the combined result. The available utterance decoders are ordered in a series based on accuracy, performance, diversity, and other factors. A recognition management engine coordinates decoding of the spoken utterance by the series of utterance decoders, combines the decoded utterances, and determines whether additional processing is likely to significantly improve the recognition result. If so, the recognition management engine engages the next utterance decoder and the cycle continues. If the accuracy cannot be significantly improved, the result is accepted and decoding stops. Accordingly, a decoded utterance with accuracy approaching the maximum for the series is obtained without decoding the spoken utterance using all utterance decoders in the series, thereby minimizing resource usage.

20 Claims, 8 Drawing Sheets

(56) References Cited

U.S. PATENT DOCUMENTS

| | | | |
|---|---|---|---|
| 6,701,293 B2* | 3/2004 | Bennett | G10L 15/32 704/246 |
| 7,058,573 B1* | 6/2006 | Murveit | G10L 15/08 704/229 |
| 7,228,275 B1* | 6/2007 | Endo | G10L 15/32 704/231 |
| 7,917,364 B2 | 3/2011 | Yacoub | |
| 8,239,195 B2 | 8/2012 | Li et al. | |
| 8,275,615 B2 | 9/2012 | Kozat et al. | |
| 8,571,860 B2 | 10/2013 | Strope et al. | |
| 2002/0193991 A1* | 12/2002 | Bennett | G10L 15/32 704/247 |
| 2003/0120486 A1* | 6/2003 | Brittan | G10L 15/32 704/231 |
| 2004/0138885 A1* | 7/2004 | Lin | G10L 15/32 704/240 |
| 2006/0009980 A1* | 1/2006 | Burke | G10L 15/32 704/270 |
| 2009/0138265 A1* | 5/2009 | Willett | G10L 15/30 704/251 |
| 2009/0204410 A1* | 8/2009 | Mozer | G10L 15/30 704/275 |
| 2010/0004930 A1* | 1/2010 | Strope | G10L 15/32 704/240 |
| 2010/0082343 A1* | 4/2010 | Levit | G10L 15/32 704/257 |
| 2010/0114577 A1* | 5/2010 | Hayn | G10L 15/32 704/257 |
| 2010/0312557 A1* | 12/2010 | Strom | G10L 15/065 704/246 |
| 2010/0318355 A1 | 12/2010 | Li et al. | |
| 2011/0161077 A1* | 6/2011 | Bielby | G10L 15/32 704/231 |
| 2012/0259627 A1* | 10/2012 | Willett | G10L 15/142 704/231 |
| 2013/0151250 A1* | 6/2013 | Vanblon | G10L 15/32 704/235 |
| 2014/0379338 A1* | 12/2014 | Fry | G10L 15/19 704/246 |
| 2015/0269949 A1* | 9/2015 | Chang | G10L 15/32 704/201 |

OTHER PUBLICATIONS

PCT International Search Report in PCT/US2015/020849, dated Jun. 18, 2015, 11 pages.

PCT 2nd Written Opinion in PCT/US2015/020849, dated Nov. 6, 2015, 4 pages.

Ma, et al., "Phrase-level System Combination for Machine Translation Based on Target-to-Target Decoding", In Proceedings of the Tenth Biennial Conference of the Association for Machine Translation in the Americas, Oct. 28, 2012, 10 pages.

Du, et al., "An Incremental Three-pass System Combination Framework by Combining Multiple Hypothesis Alignment Methods", In International Journal on Asian Language Processing, Retrieved on: Jan. 2, 2014, 15 pages.

Macherey, et al., "An Empirical Study on Computing Consensus Translations from Multiple Machine Translation Systems", In Proceedings of the Joint Conference on Empirical Methods in Natural Language Processing and Computational Natural Language Learning, Jun. 2007, 10 pages.

Fiscus, Jonathan G., "A Post-Processing System to Yield Reduced Word Error Rates: Recognizer Output Voting Error Reduction (ROVER)", In IEEE Workshop on Automatic Speech Recognition and Understanding, Dec. 14, 1997, 8 pages.

U.S. Appl. No. 14/219,642, Office Action dated Feb. 12, 2016, 22 pages.

U.S. Appl. No. 14/219,642, Amendment and Response filed Jun. 13, 2016, 16 pages.

U.S. Appl. No. 14/219,642, Notice of Allowance dated Sep. 13, 2016, 9 pages.

\* cited by examiner

INCREMENTAL UTTERANCE DECODER COMBINATION FOR EFFICIENT AND ACCURATE DECODING

CROSS-REFERENCE TO RELATED APPLICATION(S)

This application is a Continuation Application of, and claims priority to, U.S. patent application Ser. No. 14/219,642, filed Mar. 19, 2014, now U.S. Pat. No. 9,552,817, and entitled "INCREMENTAL UTTERANCE DECODER COMBINATION FOR EFFICIENT AND ACCURATE DECODING," which application is incorporated herein by reference in its entirety.

BACKGROUND

Offline (i.e., non-real-time) speech recognition systems are used in scenarios where a contemporaneous response to a spoken utterance is not required. Examples of uses for offline speech recognition include generating unsupervised training data for language and acoustic modeling, audio indexing, and automatic voicemail transcription. Without the real-time constraint, the option exists to pass the spoken utterances through multiple utterance decoders in order to reduce the recognition error rate; however, the resource cost must still be considered. The requirements in terms of computation power, storage, time, and other resources quickly become significant when every spoken utterance is processed by multiple offline utterance decoders, much less all available offline utterance decoders. Thus, even for offline speech recognition the cost must be weighed against the benefits of using additional systems to achieve recognition error rate reduction.

It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of an incremental speech recognition system incrementally decode a spoken utterance, using the next utterance decoder only when the additional utterance decoder is likely to add significant benefit to the combined result. Multiple utterance decoders are ordered in a series based on accuracy, performance, diversity, and other factors. A recognition management engine coordinates the incremental decoding of the spoken utterance by the series of utterance decoders, combines the decoded utterances, and determines whether additional processing is likely to significantly improve of the result. If so, the recognition management engine engages the next utterance decoder and the cycle continues. If the result is unlikely to be significantly improved, the result is accepted and decoding stops.

Available utterance decoders may be tested against annotated training data to develop the recognition accuracy, system diversity, performance, or other metrics, which are used to rank the utterance decoders. Based on the rankings, the utterance decoders are sequenced into a series. The ordering of the utterance decoders is selectable to provide a trade-off between accuracy and resource usage based on the scenario requirements.

After configuration, spoken utterances are sequentially processed by successive utterance decoders in the series. The utterance decoder decodes the spoken utterance and returns the recognition result to the recognition manager. If no prior recognition result is available, the current result is treated as the proposed recognition result. For the second and subsequent attempts to decode the spoken utterance, the new recognition result is combined with the prior recognition result to produce the new proposed recognition result.

The recognition manager determines an estimated reliability for the proposed recognition result based on the performance scores associated with the components of the proposed recognition result. The recognition result may include the decoded utterance and performance scores generated by the utterance decoder. In various embodiments, the estimated reliability may be obtained using a performance score, such as the recognition confidence, for each of the decoded utterances in the combined result or feeding a statistical classifier with various scores associated with the components of the proposed recognition result.

The estimated reliability is compared to an acceptance threshold to determine whether to invest additional resources in recognizing the spoken utterance. If the estimated reliability value meets or exceeds the threshold, the proposed recognition result is accepted as the final recognition result and recognition of the spoken utterance concludes.

Under normal circumstances, few spoken utterances will need to be decoded by all of the available utterance decoders, but the final decoded utterance combination will have accuracy approaching and, often, very close to the maximum obtainable if the spoken utterance had been decoded with all available utterance decoders and the decoded utterances combined. Overall, the incremental speech recognition system is able to capture almost the full benefit of the complete multiple utterance decoder combination at a fraction of the cost.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation, or an implementation combining software and hardware aspects. The following detailed description is, therefore, not to be taken in a limiting sense.

Embodiments of an incremental speech recognition system are described herein and illustrated in the accompanying figures. The incremental speech recognition system incrementally decodes a spoken utterance, using an additional utterance decoder only when the additional utterance decoder is likely to add significant benefit to the combined result. The available utterance decoders are ordered in a series based on accuracy, performance, diversity, and other factors. A recognition management engine coordinates decoding of the spoken utterance by the series of utterance decoders, combines the decoded utterances, and determines whether additional processing is likely to significantly improve the recognition result. If so, the recognition management engine engages the next utterance decoder and the cycle continues. If the accuracy cannot be significantly improved, the result is accepted and decoding stops. Accordingly, a decoded utterance with accuracy approaching the maximum for the series is obtained without decoding the spoken utterance using all utterance decoders in the series, thereby minimizing resource usage.

Figure 1:
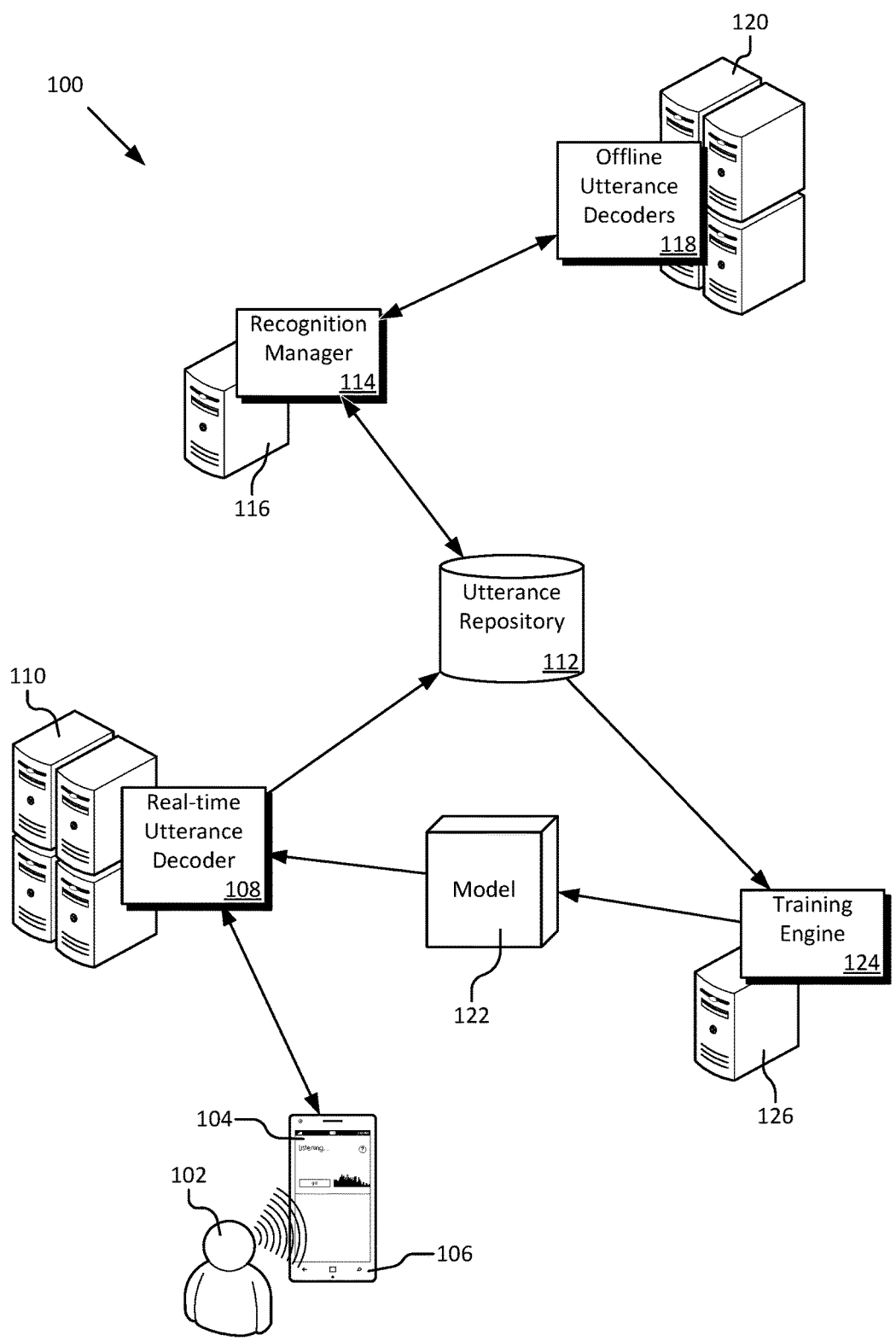
FIG. 1 illustrates one embodiment of an incremental speech recognition system that incrementally decodes a spoken utterance to minimize resource usage in a typical operating environment.

FIG. 1 illustrates one embodiment of an incremental speech recognition system that incrementally decodes a spoken utterance to minimize resource usage in a typical operating environment. The incremental speech recognition system 100 obtains spoken utterances from an utterance source. A spoken utterance refers to one or more sounds made by a speaker and collected in a form usable with an utterance decoder (e.g., an audio file or stream). For example, spoken utterances may be collected from a user 102 interacting with a speech-enabled application 104 running on a client device 106. Examples of suitable client devices include, but are not limited to, laptop computers, desktop computers, mobile phones, personal digital assistants, smartphones, smartwatches, video game systems, smart appliances (e.g., smart televisions), navigation systems, and automotive entertainment systems (e.g., car radios). It should be appreciated that the client device may combine multiple component devices (e.g., a video game system and a television) to provide the minimum functionality.

The operating environment of the illustrated embodiment depicts a speech recognition model training scenario to improve real-time speech recognition. The audio data for the spoken utterance may be transmitted to a real-time (i.e., online) utterance decoder 108, which translates (i.e., recognizes or decodes) the speech into text (i.e., a decoded utterance). In the illustrated embodiment, the real-time utterance decoder runs on a remote computing device 110. In other embodiments, the utterance decoder may run on the client device and process the spoken utterance locally. The real-time utterance decoder decodes the audio data and returns the decoded utterance to the speech-enabled application.

The spoken utterances may be added to an utterance history stored in an utterance repository 112 for offline uses, such as, but not limited to, generating unsupervised training data for language and acoustic modeling, audio indexing, and automatic voicemail transcription.

A recognition manager 114 running on a computing device 116 sequences the operation of a plurality of offline utterance decoders 118 running on one or more computing devices 120. Each utterance decoder is available to independently decode spoken utterances and provide potentially different results from the other utterance decoders due to differences in certain system components, such as the language model, the acoustic model, and the decoding engine configuration.

The utterance decoders are ordered in a series. In various embodiments, the recognition manager incrementally and selectively engages each utterance decoder and combines the results until a stop condition occurs. A stop condition may occur when a decoded utterance with a specified reliability (e.g., level of accuracy) is returned or the decoded utterance has been decoded by all utterance decoders in the series. The order of the utterance decoders reflects a compromise between the maximum accuracy obtainable by combining decoded utterances from all available utterance decoders and the minimum resource usage obtainable by foregoing the use of multiple utterance decoders or using only some of the available utterance decoders.

The outcome at either extreme leaves something to be desired. Using each available utterance decoder necessarily involves the maximum resource usage. The gains in accuracy achieved by using all available utterance decoders may be marginal relative to the cost in additional resources expended to achieve those gains. Conversely, minimum resource usage constrains the maximum accuracy to the capabilities of a single utterance decoder. While the resource cost may be low when using a single utterance decoder, significant gains in accuracy may be achieved by combining the results from a few utterance decoders. In many cases, an acceptable accuracy approaching the maximum accuracy obtainable by combining decoded utterances from all available utterance decoders may be obtained using fewer than all available utterance decoders. However, the number of utterance decoders needed to obtain a desired accuracy level varies for different spoken utterances.

After engaging an utterance decoder, the recognition manager combines the current decoded utterance with the prior results and evaluates the accuracy of the resulting decoded utterance combination. If a selected level of accuracy is achieved, the decoded utterance combination is accepted as the decoded utterance for that spoken utterance, and no additional utterance decoders are engaged. In some embodiments, the recognition manager also terminates decoding if it appears likely that none of the available utterance decoders will be able to accurately decode the spoken utterance. The final decoded utterance is then associated with the spoken utterance in the utterance repository.

The stored spoken utterances and associated decoded utterances are available for use in a variety of tasks. In the illustrated embodiment, the spoken utterances and the associated decoded utterances are used to train a new general decoding model 122 (e.g., an acoustic or linguistic model) for use with the real-time utterance decoder. When a suitable number of spoken utterances have been accurately decoded, the spoken utterances and the associated decoded utterances may be passed to a training engine 124 running on a computing device 126. In other embodiments, the associated decoded utterances may be automated transcriptions of voice mail messages (i.e., the spoken utterances) that are sent to or are otherwise accessible to the voice mail recipients.

Some or all of the utterance decoders and the recognition manager may be executed on the same computer system or on separate computer systems (i.e., distributed systems). The computer systems may be implemented as individual computing devices (e.g., servers) or computing devices farms (e.g., server farms). Distributed computer systems may communicate via one or more networks, such as, but not limited to, the Internet, wide area networks, local area networks, and personal area networks.

Figure 2:
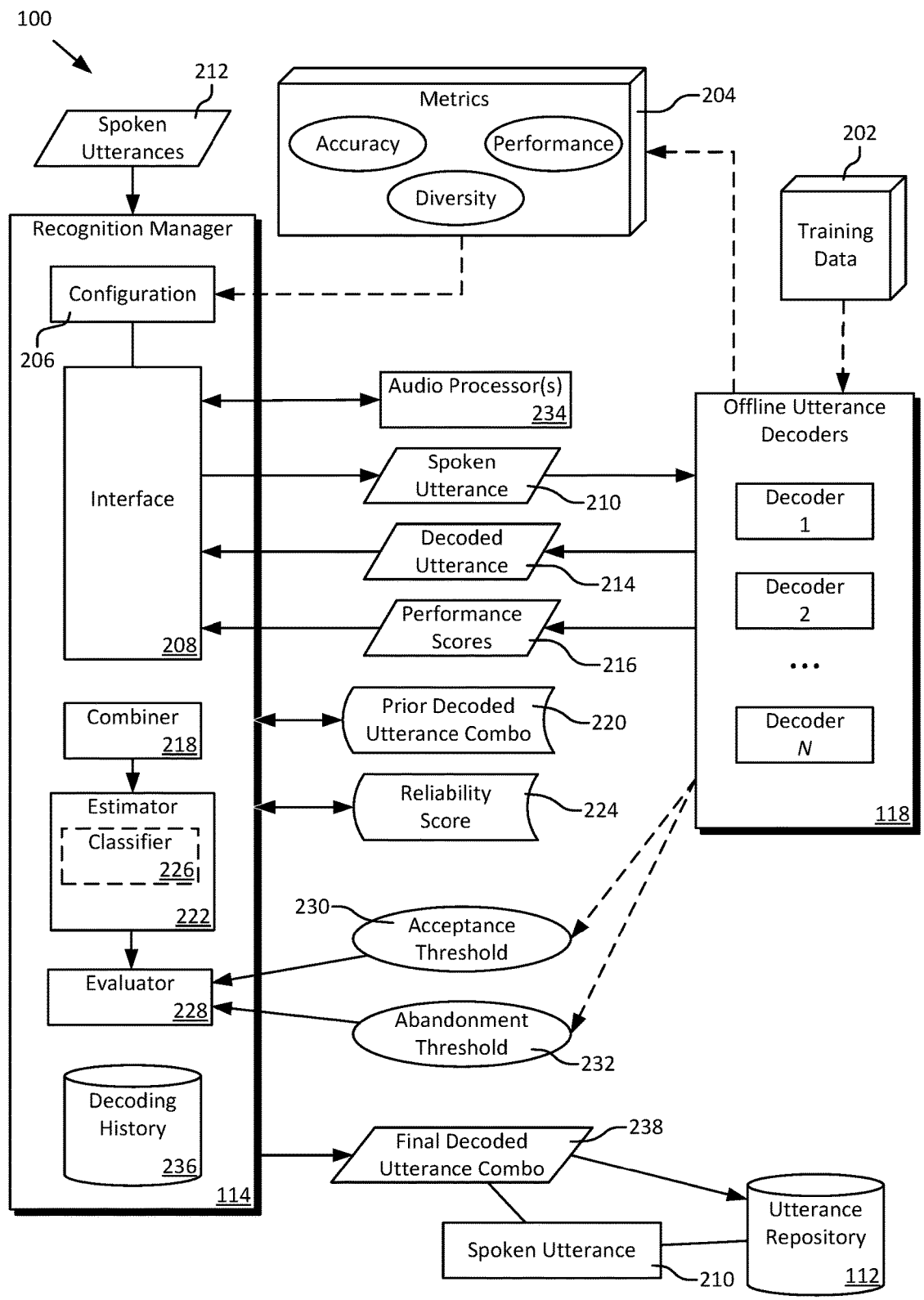
FIG. 2 is a block diagram of one embodiment of the incremental speech recognition system.

FIG. 2 is a block diagram of one embodiment of the incremental speech recognition system. The utterance decoders 118 decode annotated training data 202 (e.g., spoken utterances with transcriptions) to generate baseline metrics 204 representing the characteristics useful in ranking and ordering the utterance decoders. The baseline metrics may include recognition accuracy metrics, such as, but not limited to, the word error rate (WER) and/or the sentence error rate (SER). In addition, the utterance decoders may be evaluated for performance metrics, such as decoding speed, memory usage, and other resource usage related characteristics. Diversity metrics may be generated based on the similarities and/or differences in the algorithms, the acoustic models, the language models, and other characteristics of the utterance decoders, as well as the similarities and/or differences in the decoded utterance results generated by the utterance decoders (e.g., agreement rates) using the training data may be used as factors in evaluating the diversity between the utterance decoders.

The utterance decoders are ordered in a series based on the rankings and the recognition manager 114 is configured. The configuration 206 may also contain additional information, such as, but not limited to, the sequencing of the speech recognition components, the call needed to engage the speech recognition components (e.g., the entry point and any arguments), and the reference values for use in evaluating the recognition result. The reference values may be specific to each utterance decoder or may be global.

A decoder interface 208 handles the interactions between the recognition manager and the utterance decoders. The decoder interface selects a spoken utterance 210 from the collection of spoken utterances 212 to be decoded and calls the next utterance decoder. In various embodiments, the recognition manager loads the spoken utterance into memory and streams the audio data to the utterance decoder. Alternatively, where memory storing the audio data is accessible to the utterance decoder, the recognition manager may pass a pointer to the audio data object to the utterance decoder. In other embodiments, the recognition manager passes a reference, such as the uniform naming convention (UNC) or operating specific path of the audio file or a database record index for the spoken utterance, to the utterance decoder, which loads the audio file or accesses the record directly.

After the spoken utterance has been decoded, the decoder interface receives the decoded utterance 214 and the associated performance scores 216 from the current utterance decoder. A combiner 218 combines the current decoded utterance with the previous decoded utterance combination 220, if such exists. An estimator 222 uses the performance scores associated the decoded utterances that make up the decoded utterance combination to estimate a reliability score 224 for the current decoded utterance combination. The reliability score is a measure of the accuracy of the decoded utterance combination and the likelihood that an additional system combination may further reduce error. In some embodiments, the reliability score is estimated using a statistical classifier 226 built using the results from decoding the training data with the configured series of utterance decoders.

An evaluator 228 compares the reliability score to the reference values corresponding to the current offline decoder. The reference values may include an acceptance threshold 230 at or above which the decoded utterance is accepted, and, in some embodiments, an abandonment threshold 232 below which the spoken utterance is considered undecodable. In other words, the abandonment threshold corresponds to a level indicating that the spoken utterance may be too difficult to decode correctly with the existing utterance decoders. In either case, there is no need to waste additional decoding on that spoken utterance. In various embodiments, the acceptance threshold represents the minimum level of accuracy needed to consider the spoken utterance properly decoded. Decoding of the training data may be used to tune the acceptance thresholds and/or the abandonment thresholds.

Embodiments of the incremental speech recognition system may optionally refer a spoken utterance for audio processing based on a decision from the evaluator. Accordingly, the incremental speech recognition system may include one or more audio processors 234 that provide auxiliary processing of the audio files or data. Various audio processors may chunk the audio data into units at natural breaks in the spoken utterances (e.g., turns in a conversation or significant pauses), normalize the audio (e.g., volume leveling), enhance the audio (e.g., emphasize or de-emphasize selected frequencies in the audio), remove or reduce discrete noises (e.g., hisses, pops), remove or reduce background sounds or noise at constant frequency or in a constant frequency range (e.g., wind noise).

For example, if a reliability score falls below the abandonment threshold, the decoder interface may engage an audio processor to clean-up or enhance the spoken utterance and then resubmit the processed spoken utterance to the current utterance decoder for re-decoding. If the decoding continues to fail after audio processing is completed, decoding of that spoken utterance is abandoned. The audio processing referral decision may be based on other criteria, such as a reliability score below, but within a certain percentage of the acceptance score, or a specifically-defined referral threshold.

In various embodiments, the audio processors may be integrated into the series of utterance decoders or placed in a separate series and incrementally invoked in the same manner as the utterance decoders. Accordingly, the resource cost associated with the audio processors may also be minimized by only using the audio processors when needed and only using as many audio processors as needed to achieve satisfactory results.

A decoding history memory 236 stores information about the decoding of the spoken utterance, such as the decoded utterances and associated performance scores returned by each of the utterance decoders and the decoded utterance combinations and associated estimated reliabilities or other derived values combination. When an acceptable final decoded utterance combination 238 is obtained, it is linked to the corresponding spoken utterance and stored, for example, in the utterance repository 112.

Under normal circumstances, few spoken utterances will need to be decoded by all of the available utterance decoders, but the final decoded utterance combination will have accuracy approaching and, often, very close to the maximum obtainable had the spoken utterance been decoded with all available utterance decoders and the decoded utterances combined. Overall, the incremental speech recognition system is able to capture almost the full benefit of the complete multiple utterance decoder combination at a fraction of the cost.

Figure 3:
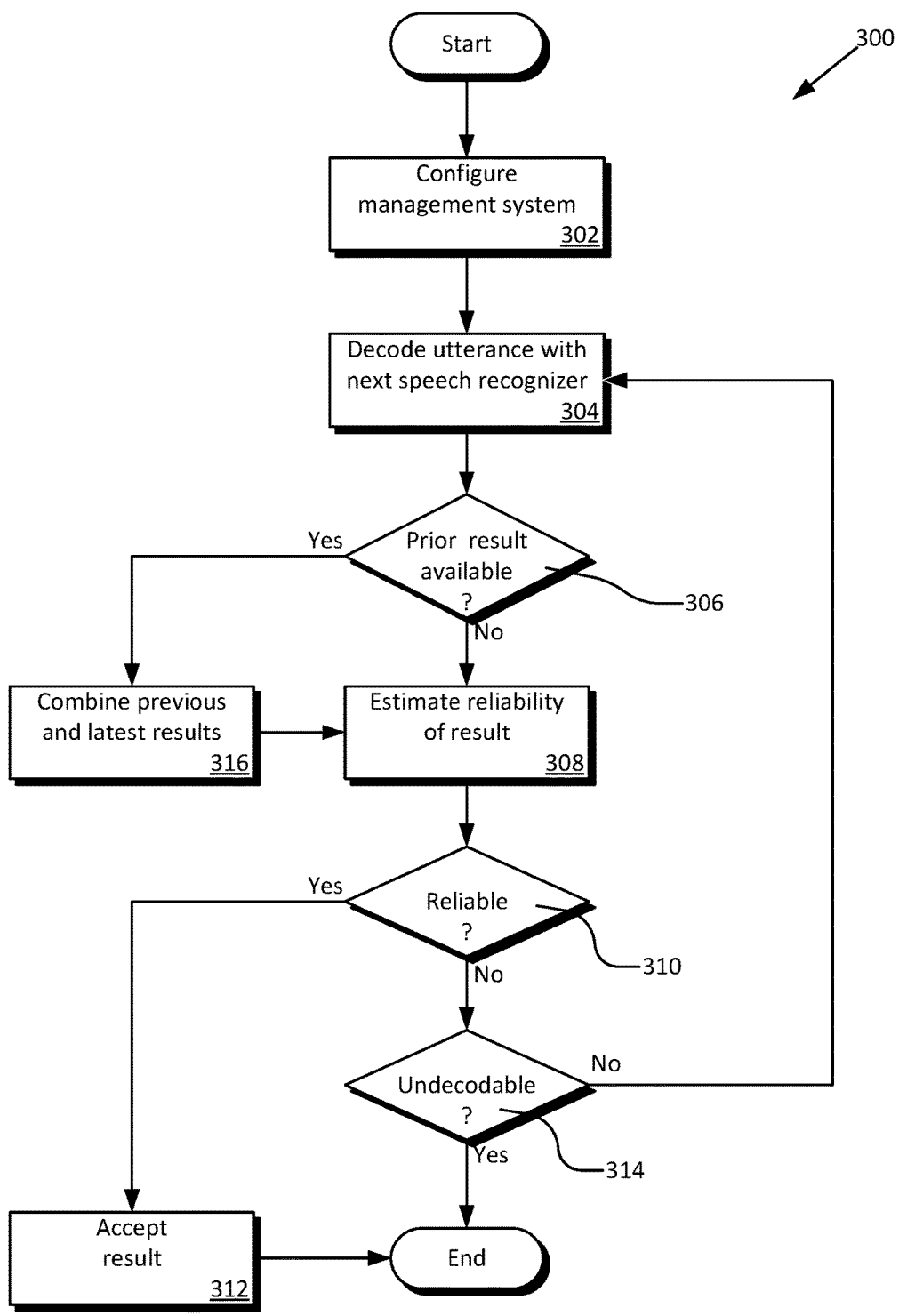
FIG. 3 is a high level flowchart of one embodiment of a recognition management method for efficiently performing offline speech recognition in a multiple utterance decoder environment using minimal resources.

FIG. 3 is a high level flowchart of one embodiment of a recognition management method for efficiently performing offline speech recognition in a multiple utterance decoder environment using minimal resources. The recognition management method 300 includes a configuration operation 302. During configuration, available utterance decoders may be tested against annotated training data to develop recognition accuracy, system diversity, performance, or other (e.g., derived) metrics, which may be used to rank the utterance decoders.

Based on the rankings, the utterance decoders are ordered into a series. The ordering of the utterance decoders is selectable to provide a trade-off between accuracy and resource usage based on the scenario requirements. In simple embodiments, sequencing may be based on a single characteristic, such as the word error rate. In some embodiments, sequencing may be based on multiple criteria, such as, a combination of recognition accuracy and system diversity metrics. For example, utterance decoders producing dissimilar results are likely to have more synergy and produce a better quality combined result. To take advantage of this synergy, after selecting the utterance decoder with the lowest word error rate as the first utterance decoder in the series, the remaining utterance decoders may be ordered by a weighted sum of the each utterance decoder's word error rate and the agreement rate with the first utterance decoder's result. In an example of a derived metric, the ratio of error rate to processing speed is used for sequencing. Such a derived metric may be used to give preference to faster utterance decoders with good, but not necessarily the best, recognition accuracy metrics earlier in the series.

After configuration, the incremental speech recognition is ready to process unannotated spoken utterances. An utterance decoding operation 304 passes a spoken utterance to the next utterance decoder in the series. The utterance decoder decodes the spoken utterance and returns the recognition result (i.e., the decoded utterance) and one or more performance scores to the recognition manager.

A prior result decision 306 determines if a prior recognition result for the spoken utterance is available. If no prior recognition result is available, the current result alone is treated as the proposed recognition result.

A reliability estimation operation 308 determines an estimated reliability for the proposed recognition result based on one or more performance scores associated with the components of the proposed recognition result. Depending upon the utterance decoder, the recognition result may include the decoded utterance together with performance scores generated by the utterance decoder. For example, the utterance decoder may provide a recognition confidence score with the decoded utterance. Some utterance decoders may return alternative hypotheses for each spoken utterance. Alternative hypotheses may be presented in the form of an N-best list, a recognition lattice, and other similar arrangements. Each alternative hypothesis may contain an instance of alternative decoded utterance and a recognition confidence associated with that alternative decoded utterance. In addition, the alternative hypothesis may contain additional information and performance scores, including, without limitation, a language model and/or an acoustic model score. When alternative hypotheses exist, the reliability estimation operation may work with the top result (e.g., first result in the N-best list).

In various embodiments, the estimated reliability may be obtained using the recognition confidence. For the proposed recognition result from the initial decoding operation, the reliability estimation operation may simply adopt the recognition confidence or one of the other individual performance scores (e.g., language or acoustic model scores), returned by the initial utterance decoder. Alternatively, the reliability estimation operation may derive the estimated reliability from the various features of the recognition result, such as, but not limited to, the recognition confidence, the language model score, the acoustic model score, the N-best list or recognition lattice size, and the N-best list item or recognition lattice item diversity. For example, a small N-best list size and/or limited diversity between the N-best list items suggest greater confidence in the results.

Embodiments of the reliability estimation operation may use a statistical classifier trained using the training data to predict the accuracy of the combined result and the likelihood that an additional system combination may further reduce error using various scores associated with the decoded utterances in the combined result as inputs. In some embodiments, the reliability estimation operation compiles one or more performance scores and/or derivative values associated with each recognition result in the proposed recognition result, values from cross-systems comparisons, and/or prior estimated reliability values are used as inputs to the statistical classifier.

A reliability evaluation operation 310 compares the estimated reliability against the proposed recognition result against an acceptance threshold to determine whether to invest additional resources in recognizing the spoken utterance. In various embodiments, the acceptance threshold is a threshold value for the corresponding score (e.g., a reliability or recognition confidence value). A global value or individual values corresponding to the different utterance decoders may be configured for the acceptance threshold and other reference values (e.g., the abandonment or referral thresholds).

If the estimated reliability value meets or exceeds the threshold, a result acceptance operation 312 accepts the proposed recognition result as the final recognition result and recognition of the spoken utterance concludes. In other words, no further resources are invested in improving the recognition result for the spoken utterance.

If proposed recognition result is determined not to have sufficient reliability, an optional decodability operation 314 may compare one or more of the performance scores against corresponding failure indicators (e.g., the abandonment threshold) to determine whether to invest additional resources in recognizing the spoken utterance. In various embodiments, the failure indicators are reference values indicating a high level of difficultly in decoding the spoken utterance. This high level of difficulty corresponds to a high probability that the spoken utterance cannot be acceptably decoded by any of the other utterance decoders in the series. For example, a low acoustic model score may indicate that the audio quality of the spoken utterance is so poor as to render the spoken utterance unrecognizable. In various embodiments, recognition of the spoken utterance is abandoned, and no further resources are invested in attempting to recognize the spoken utterance if the abandonment threshold is not met by the appropriate score.

When the recognition result is neither accepted as being accurate nor rejected as being unrecognizable, the method returns to the utterance decoding operation 304 to attempt to acceptably decode the spoken utterance using the next utterance decoder in the series.

On the second and subsequent attempts to decode the spoken utterance, a prior recognition result exists and the prior result decision branches to a combining operation 316. The combining operation merges the newly decoded utterance with the prior recognition result to produce a new/updated proposed recognition result. Generally, any technique for combining multiple recognition results may be used to generate the proposed recognition result. For example, the recognition results may be combined using utterance-level re-ranking or recognizer output voting error reduction.

When using a combined result as the proposed recognition result, the reliability estimation operation 308 is still tasked with generating an estimated reliability value for the proposed recognition result, but the estimated reliability value is based on multiple recognition results. In other words, the reliability estimation operation may combine the prior estimated reliability value associated with the prior recognition result with the estimated reliability determined for the current recognition result. In the simplest case, when each of the individual utterance decoders produces the same recognition result, the estimated reliability may be the average of the confidence values or other recognition accuracy metric from each of the individual utterance decoders.

Figure 4:
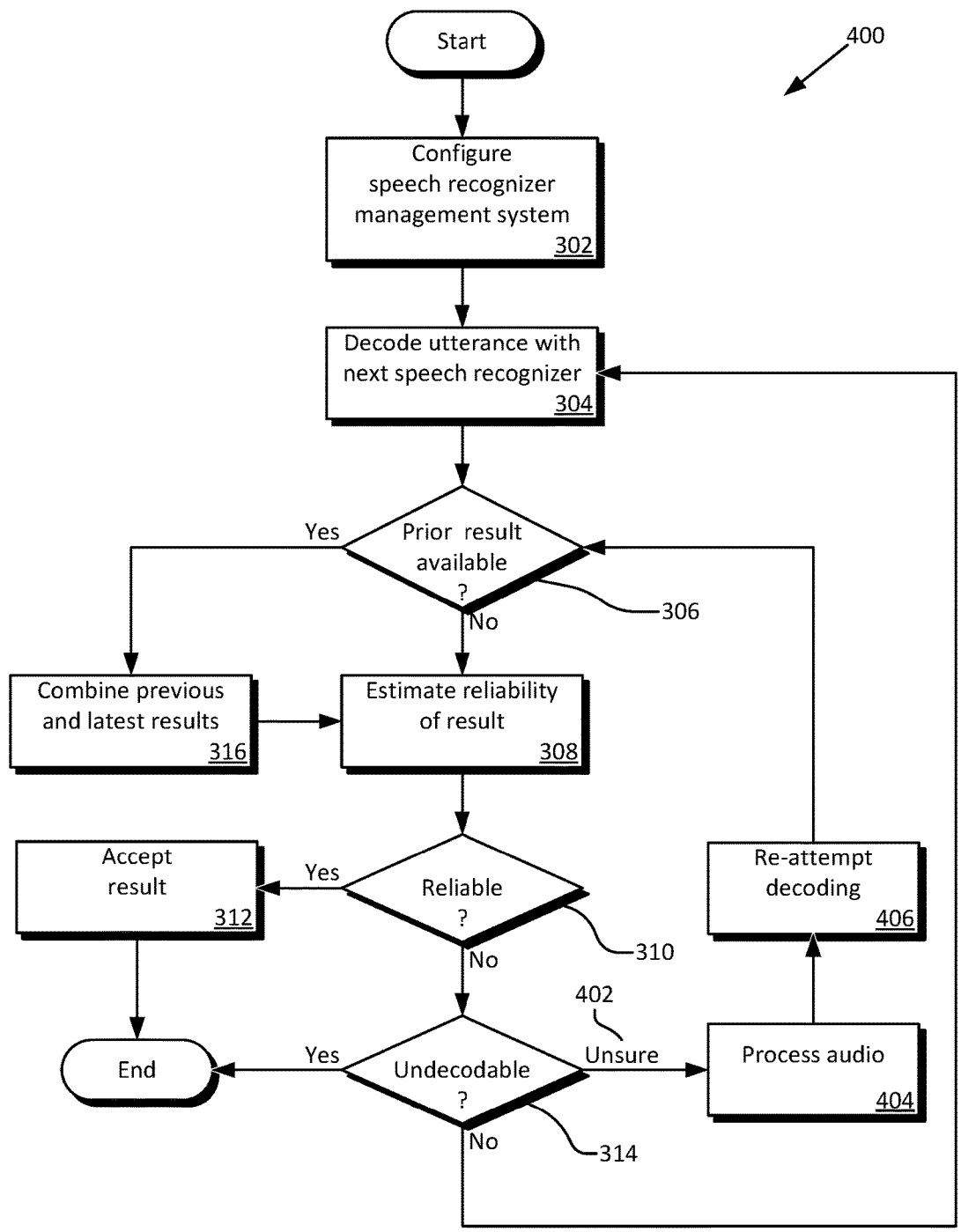
FIG. 4 is a high level flowchart of an alternate embodiment of the recognition management method.

FIG. 4 is a high level flowchart of an alternate embodiment of a recognition management method. Generally, the alternate recognition management method 400 operates in a similar manner to the previously described recognition management method 300; however, the alternate recognition management method incorporates optional audio processing in the management sequence. In the illustrated embodiment, the decodability operation also makes an audio processing referral decision 402. In other embodiments, the audio processing referral decision may be included in the estimated reliability operation or a separate operation. The result of the audio processing referral decision is used to selectively trigger application of an audio processing operation 404 to try and improve the audio quality of the spoken utterance. For example, when an utterance decoder with good general accuracy fails to recognize a significant number of words from a single spoken utterance, the audio data may undergo audio enhancement and/or noise reduction processing. Once processed, re-recognition may be attempted using the same utterance decoder in a re-decoding operation 406. Alternatively, audio processing may be part of a separate branch in the series, which contains utterance decoders optimized for problematic recognition cases. Audio processors may also be engaged only when needed for a certain utterance decoder.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
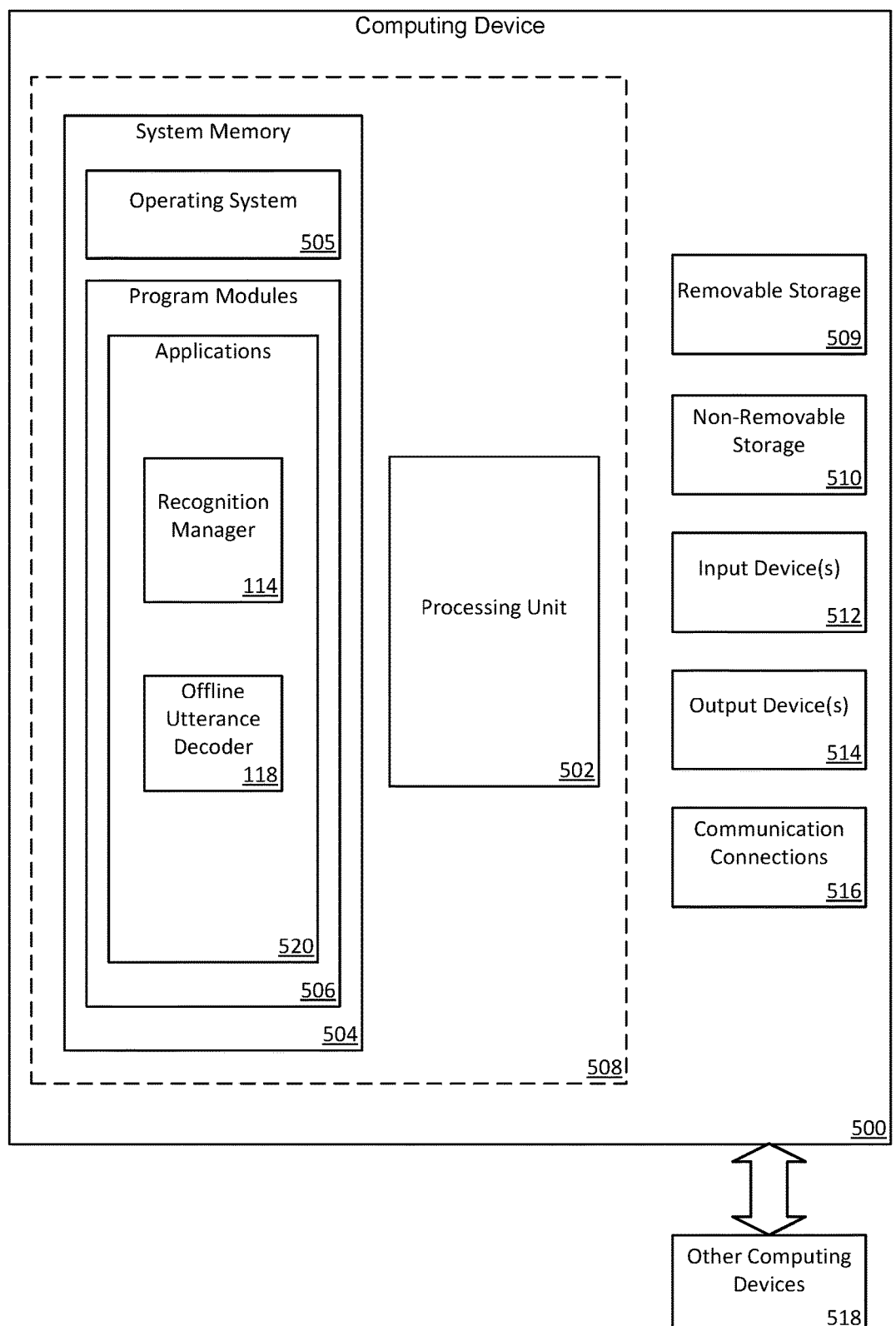
FIG. 5 is a block diagram illustrating one embodiment of the physical components of a computing device with which embodiments of the invention may be practiced.
Figure 6A:
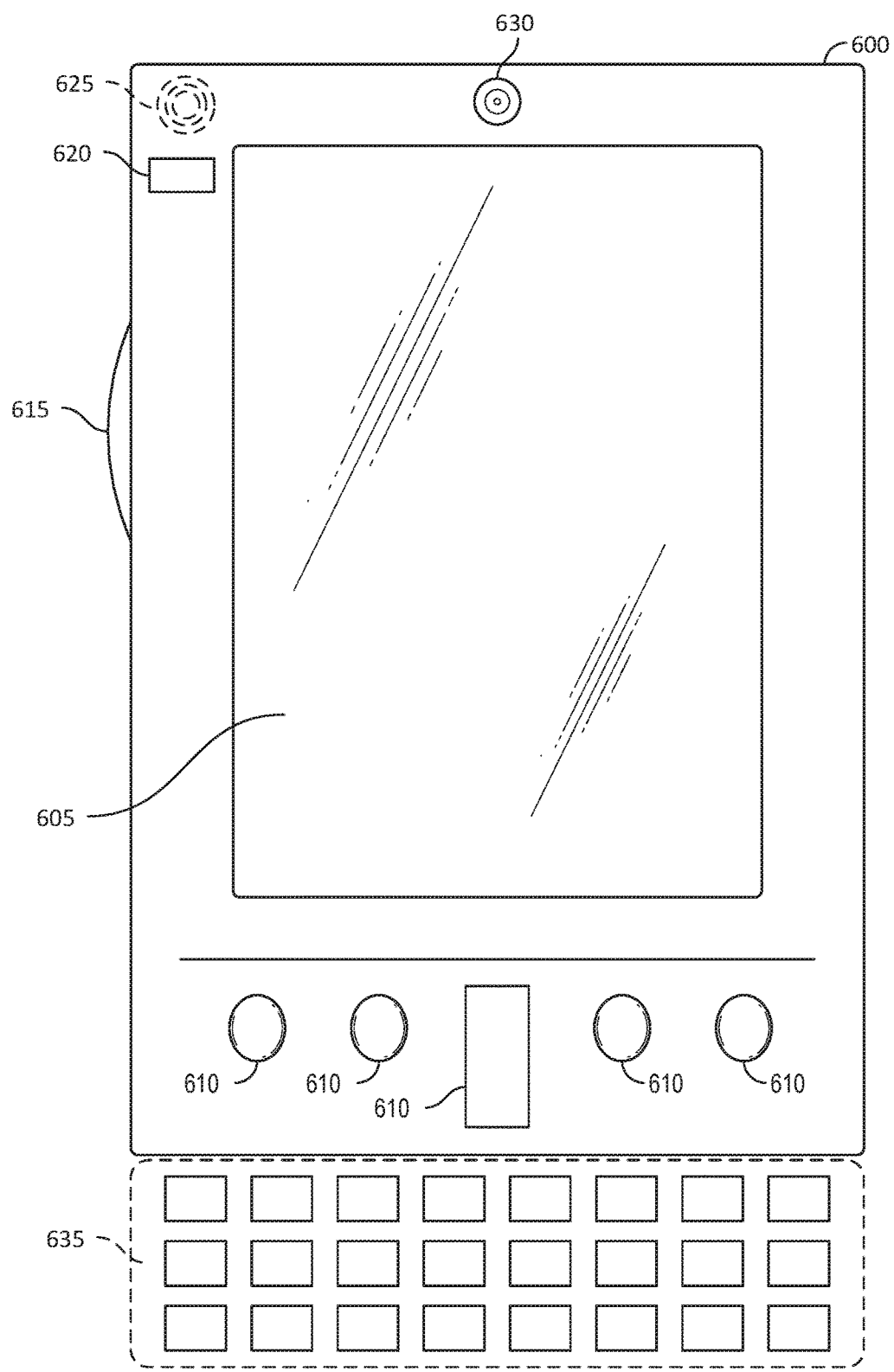
FIGS. 6A and 6B are simplified block diagrams illustrating a mobile computing device with which embodiments of the invention may be practiced.
Figure 6B:
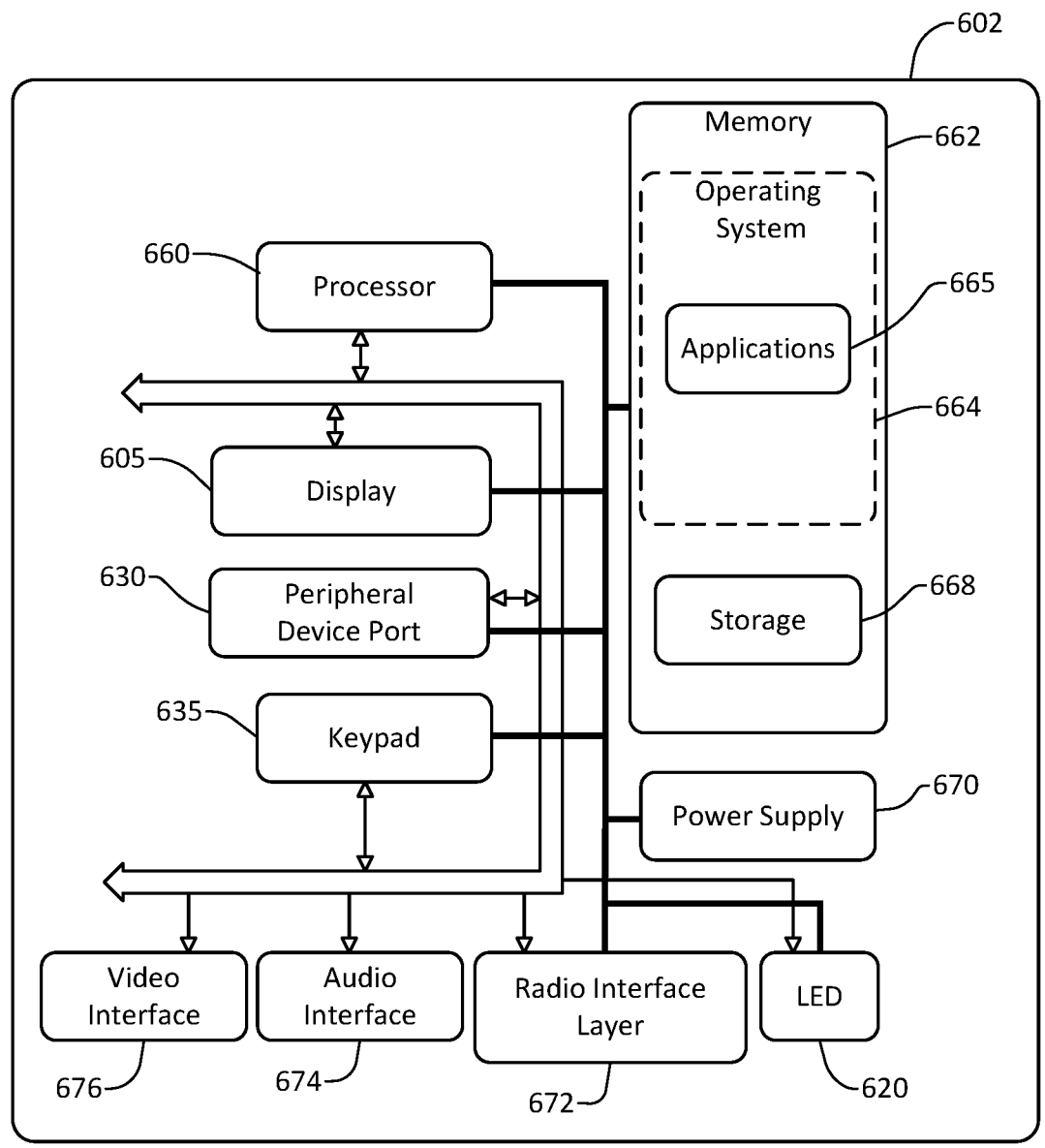
Figure 7:
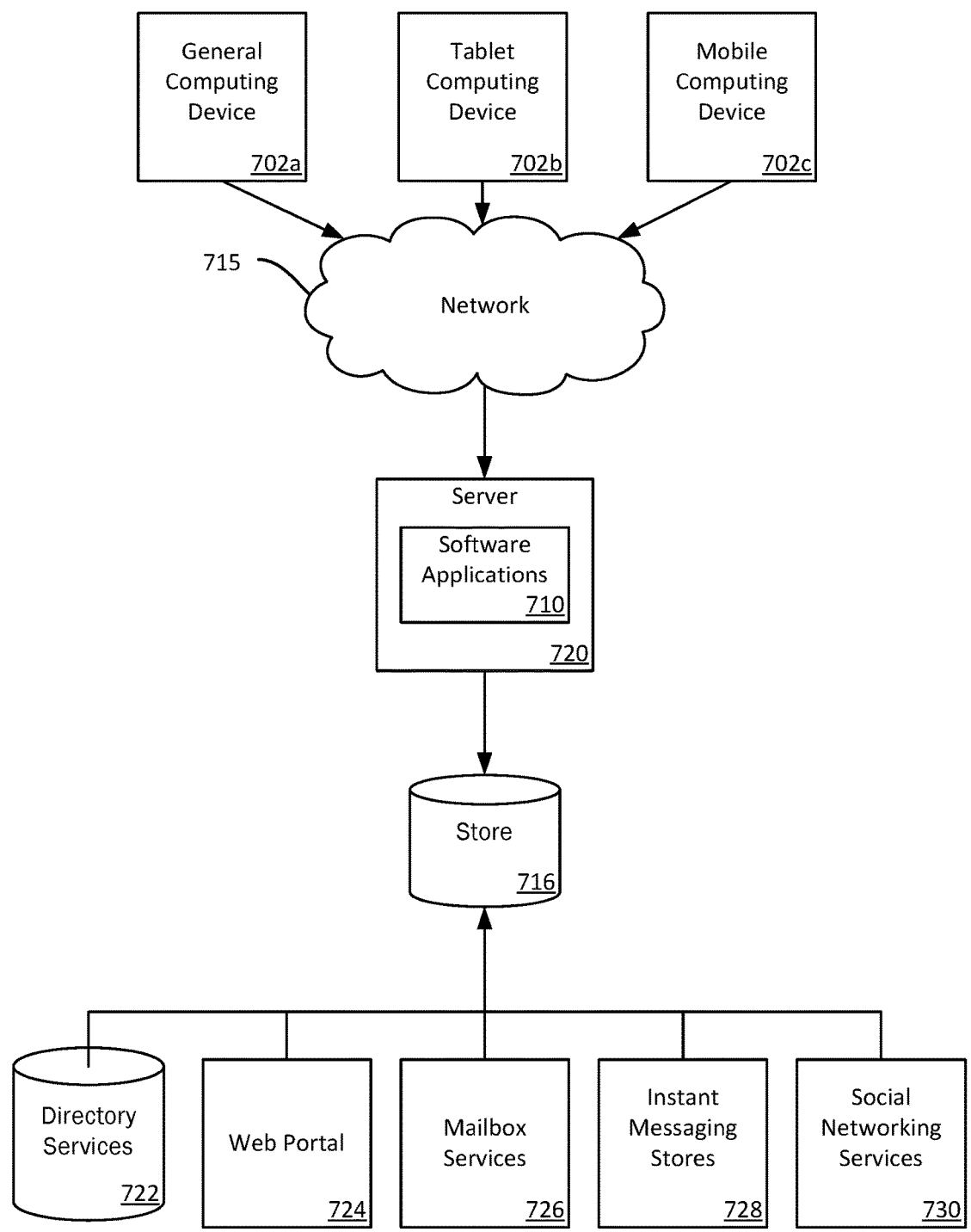
FIG. 7 is a simplified block diagram of a distributed computing system illustrating one embodiment of the architecture of a system for providing incremental speech recognition functionality, as described herein, to one or more client devices.

FIGS. 5 through 7 and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 5 is a block diagram illustrating one embodiment of the physical components (i.e., hardware) of a computing device 500 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520 such as the recognition manager 114 and the utterance decoders 118. For example, the operating system 505 may be suitable for controlling the operation of the computing device 500. Furthermore, embodiments of the invention may be practiced in conjunction with a graphics library, other operating systems, or any other application program and is not limited to any particular application or system. This basic configuration is illustrated by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated by a removable storage device 509 and a non-removable storage device 510.

As stated above, a number of program modules and data files may be stored in the system memory 504. While executing on the processing unit 502, the software applications 520 may perform processes including, but not limited to, one or more of the stages of the recognition management method 300. Other program modules that may be used in accordance with embodiments of the present invention may include electronic mail and contacts applications, word processing applications, spreadsheet applications, database applications, slide presentation applications, drawing applications, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 520 may be operated via application-specific logic integrated with other components of the computing device 500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all examples of computer storage media (i.e., memory storage). Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500.

FIGS. 6A and 6B are simplified block diagrams illustrating a mobile computing device with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface, a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a smart phone capable of running one or more applications (e.g., browsers, e-mail clients, notes, contact managers, messaging clients, games, and media clients/players). In some embodiments, the system 602 is integrated as a computing device, such as an integrated personal digital assistant (PDA) and wireless phone.

One or more application programs 665 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 665 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including software applications described herein.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the outside world via a communications carrier or service provider. Transmissions to and from the radio 672 are conducted under control of the operating system 664. In other words, communications received by the radio 672 may be disseminated to the application programs 665 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present invention, the microphone may also serve as an audio sensor to facilitate control of notifications, as will be described below. The system 602 may further include a video interface 676 that enables an operation of an on-board camera 630 to record still images, video streams, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 is a simplified block diagram of a distributed computing system illustrating one embodiment of the architecture of a system for providing incremental speech recognition functionality, as described herein, to one or more client devices. Content developed, interacted with, or edited in association with the software applications 710 may be stored in different communication channels or other storage types. For example, various documents may be stored using a directory service 722, a web portal 724, a mailbox service 726, an instant messaging store 728, or a social networking site 730. The software applications 710 may use any of these types of systems or the like for enabling data utilization, as described herein. A server 720 may provide the software applications 710 to clients. As one example, the server 720 may be a web server providing the software applications 710 over the web. The server 720 may provide the software applications 720 over the web to clients through a network 715. By way of example, the client computing device may be implemented as the computing device 500 and embodied in a personal computer 702a, a tablet computer 702b, and/or a mobile computing device (e.g., a smart phone) 702c. Any of these embodiments of the client device may obtain content from the store 716.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for accurately decoding spoken utterances with a plurality of utterance decoders, the method comprising:
   determining a first utterance decoder based on word error rate;
   calculating a system diversity metric value for each of the plurality of other utterance decoders based on each individual utterance decoder's word error rate and likelihood of agreement with a result of the first utterance decoder;
   ordering the plurality of utterance decoders into a series, the plurality of utterance decoders ordered according to the calculated system diversity metric values;
   decoding a spoken utterance with the first utterance decoder in the series and a second utterance decoder in the series; and
   merging results from the first utterance decoder and the second utterance decoder.

2. The method of claim 1, further comprising:
   evaluating an accuracy level of the merged results; and
   upon determining that the accuracy level of the merged results is acceptable, terminating decoding of the spoken utterance.

3. The method of claim 2, wherein the accuracy level is determined based on confidence values returned by the plurality of utterance decoders.

4. The method of claim 1, further comprising:
   determining that that each additional utterance decoder of the plurality of utterance decoders is unlikely to be capable of accurately decoding the spoken utterance; and
   terminating decoding of the spoken utterance.

5. The method of claim 4, wherein the accuracy of the decoded spoken utterance is determined based on confidence values returned by the plurality of utterance decoders.

6. The method of claim 1, further comprising:
decoding the spoken utterance with an additional utterance decoder of the plurality of utterance decoders to obtain an additional result;
combining the additional result with the merged results to produce a combined recognition result; and
accepting the combined recognition result if accurate.

7. The method of claim 1, wherein the first utterance decoder has a lowest word error rate of the plurality of utterance decoders, and the second utterance decoder is identified based on a metric comprising a weighted sum derived from its word error rate and its agreement rate with the first utterance decoder.

8. An incremental speech recognition system comprising:
at least one processor; and
a memory operatively connected to the at least one processor, the memory comprising computer-executable instructions that, when executed by the at least one processor, perform a method comprising:
storing audio data corresponding to a spoken utterance;
determining a first speech decoding model of a plurality of speech decoding models based on word error rate;
decoding the spoken utterance with the first speech decoding model;
calculating a system diversity metric value for each of the plurality of other speech decoding models based on each individual speech decoding model's word error rate and likelihood of agreement with a result of the first speech decoding model for the spoken utterance;
ordering the plurality of speech decoding models into a series, the plurality of speech decoding models ordered according to the calculated system diversity metric values; and
decoding the spoken utterance with the second speech decoding model in the series.

9. The incremental speech recognition system of claim 8, wherein the computer-executable instructions are further executable by the at least one processor for:
merging results from the first speech decoding model and the second speech decoding model.

10. The incremental speech recognition system of claim 9, wherein the computer-executable instructions are further executable by the at least one processor for:
evaluating an accuracy level of the merged results; and
upon determining that accuracy level of the merged results is acceptable, terminating decoding of the spoken utterance.

11. The incremental speech recognition system of claim 10, wherein the accuracy level is determined based on confidence values returned by the first and second speech decoding models.

12. The incremental speech recognition system of claim 9, wherein the computer-executable instructions are further executable by the at least one processor for:
determining that each additional speech decoding model of the plurality of speech decoding models is unlikely to be capable of accurately decoding the spoken utterance; and
terminating decoding of the spoken utterance.

13. The incremental speech recognition system of claim 12, wherein the accuracy of the decoded spoken utterance is determined based on confidence values returned by the first speech decoding model and the second speech decoding model.

14. The incremental speech recognition system of claim 9, wherein the computer-executable instructions are further executable by the at least one processor for:
decoding the spoken utterance with an additional speech decoding model of the plurality of speech decoding models to obtain an additional result; and
combining the additional result with the merged results to produce a combined recognition result.

15. The incremental speech recognition system of claim 14, wherein the computer-executable instructions are further executable by the at least one processor for:
accepting the combined recognition result if accurate.

16. The incremental speech recognition system of claim 9, wherein the computer-executable instructions are further executable by the at least one processor for:
building a statistical classifier based on results obtained by decoding training data using the series of speech decoding models.

17. A computer readable storage device containing computer-executable instructions which, when executed by a computer, perform a method for decoding spoken utterances with a plurality of utterance decoders, the method comprising:
determining a first utterance decoder based on word error rate;
calculating a system diversity metric value for each of the plurality of other utterance decoders based on each individual utterance decoder's word error rate and likelihood of agreement with a result of the first utterance decoder;
ordering the plurality of utterance decoders into a series, the plurality of utterance decoders ordered according to the calculated system diversity metric values;
decoding a spoken utterance with the first utterance decoder in the series and a second utterance decoder in the series; and
merging results from the first utterance decoder and the second utterance decoder.

18. The computer readable storage device of claim 17, wherein the computer-executable instructions are further executable by the computer for:
determining that each additional utterance decoder of the plurality of utterance decoders is unlikely to be capable of accurately decoding the spoken utterance; and
terminating decoding of the spoken utterance.

19. The computer readable storage device of claim 18, wherein the accuracy of the decoded spoken utterance is determined based on confidence values returned by the first utterance decoder in the series and the second utterance decoder in the series.

20. The computer readable storage device of claim 18, wherein the accuracy of the decoded spoken utterance is determined based on confidence values returned by each utterance decoder of the plurality of utterance decoders that have decoded the spoken utterance.

* * * * *